United States Patent
Burie et al.

(10) Patent No.: US 6,334,005 B1
(45) Date of Patent: Dec. 25, 2001

(54) MODULATOR OF THE MACH-ZEHNDER TYPE HAVING A VERY HIGH EXTINCTION RATIO

(75) Inventors: Jean-René Burie, Bruyères le Châtel; Hakon Helmers, Sceaux, both of (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/464,389

(22) Filed: Dec. 16, 1999

(30) Foreign Application Priority Data

Dec. 17, 1998 (FR) .................................... 98 15948

(51) Int. Cl.[7] ..................................... G02F 1/035
(52) U.S. Cl. ...................................... 385/3; 385/9
(58) Field of Search ............................ 385/1–10

(56) References Cited

U.S. PATENT DOCUMENTS 4,300,814 * 11/1981 Carenco ................. 385/132
5,359,449 * 10/1994 Nishimoto et al. ........... 359/181

OTHER PUBLICATIONS

C. Lawetz et al, "Modulation characteristics of semiconductor Mach–Zehnder optical modulators", Journal of Lightwave Technology, Apr. 1997, IEEE, USA, vol. 15, No. 4, pp. 697–703, XP000691037.

Patent Abstracts of Japan, vol. 096, No. 010, Oct. 31, 1996 corresponding to JP 08 160368 A (Oki Electric Ind Co, Ltd) dated Jun. 21, 1996.

* cited by examiner

Primary Examiner—Rodney Bovernick
Assistant Examiner—Michelle R. Connelly-Cushwa
(74) Attorney, Agent, or Firm—Sughrue Mion, PLLC

(57) ABSTRACT

The invention relates to modulator of the Mach-Zehnder type in which an optical wave source is coupled to an optical waveguide separating through a coupler (2) into two branches (B1, B2) which recombine, the branches being respectively provided with electro-optical modulators (4). According to the invention, the coupler (2) has an adjustable coupling ratio, regulation means being provided for adjusting the said coupling ratio following the application of at least one signal (V) to at least one of the electro-optical modulators (4) so that the output optical powers of the branches (B1, B2) are respectively equal for destructive interference conditions and for constructive interference conditions. These regulation means comprise at least one regulation electrode (5). The invention applies principally to optical signal transmission systems.

13 Claims, 3 Drawing Sheets

MODULATOR OF THE MACH-ZEHNDER TYPE HAVING A VERY HIGH EXTINCTION RATIO

BACKGROUND OF THE INVENTION

The present invention relates to a modulator of the Mach-Zehnder type.

The invention lies in the field of optoelectronic systems used for the transmission or optical processing of optical digital data.

In these systems, the information is often in the form of binary data represented by pulses modulating an optical carrier wave supplied by a laser. In the amplitude domain, the quality of an optical signal is normally defined by two parameters: the signal to noise ratio and the extinction ratio. The signal to noise ratio is defined as the ratio of the optical power of the signal to the noise power in a wavelength band containing the wavelength of the signal carrier. The extinction ratio is defined as the ratio of the powers corresponding respectively to the high and low levels of the signal.

There exist more particularly two coding techniques for the high-output sources. A first coding technique consists in producing a modulator by electro-absorption. Such a modulator is very simple in principle. It is composed in fact of a guide to which a control voltage is applied. This voltage moves the absorption peak of the semiconductor structure of the guide towards the working wavelength. The absorption profile in the guide therefore depends on the control voltage, which makes it possible to produce an amplitude modulation of the wave passing through the guide. Nevertheless, this coding technique then gives rise to frequency modulation problems related to the amplitude modulation.

A second technique of coding an optical wave consists in using a modulator of the Mach-Zehnder type. Such a modulator is more difficult to implement but makes it possible to effect better control of the frequency modulation.

A modulator of the Mach-Zehnder type is generally produced in a semiconductor substrate in order to facilitate its integration with other active components. Preferentially, the Mach-Zehnder is produced on an InP or AsGa support or on any other III–V material. The Mach-Zehnder can however be produced in any type of semiconductor material. More particularly, a Mach-Zehnder modulator is in the form of an active monolithic structure with uniform amplification over the entire substrate and sections which are electrically insulated in order to form the branches.

A modulator of the Mach-Zehnder type according to the state of the art is illustrated in FIG. 1. Such a modulator functions essentially as an interferometer. This is because a Mach-Zehnder modulator is composed of two branches conveying two coherent waves coupled in order to form the output signal. A light beam is separated in two by means of a semi-reflecting separator plate or by means of an electro-optical coupler.

An electrode is placed on each branch in order to modulate the phase by an electro-optical effect. The electro-optical effect results from an interaction between the guided optical wave and an electrical field which causes a modification of the permittivity of the environment. This interaction makes it possible to modulate the phase or amplitude of the optical wave. At the output of the branches, the light signals are collected by a second semi-reflecting plate or by a second coupler in order to form interferences.

Transmission will be maximum in the case of constructive interference, when the two branches are in phase, and minimum in the case of destructive interference when the branches are in phase opposition. Such a modulator makes it possible to effect an analogous modulation of the light intensity.

More particularly, the branches are composed of a medium whose index varies according to the optical power conveyed. A control voltage is applied to one branch, referred to as the active branch, and causes a change in index in this branch in order to modulate the optical signal passing through the active branch and thus obtain constructive and destructive interferences at the point of recombination of the two branches.

In contradistinction, the branch opposite the active branch is referred to as the passive branch.

One particular problem results however from this technique: the change in index in the active branch of the Mach-Zehnder also gives rise to a variation in absorption which causes a modification in the amplitude of the output power of this branch. In particular, the output power of the active branch will not be identical to the output power of the passive branch. The interferences will therefore not be totally destructive. The output powers not being equal at the recombination point, the interference will not be total and the coding will be impaired.

It has been established that the variation in absorption depends on the wavelength of the optical signal and has a peak for a given wavelength. The Mach-Zehnder modulator will therefore in general be used for a working wavelength distant from the absorption peak.

Nevertheless, the variation in absorption is never completely zero at the working wavelength, and consequently the interferences are never completely destructive.

The solutions offered by the prior art consist mainly in optimising the composition of the semiconductor layers which make up the structure of the Mach-Zehnder in order to optimise the variation in the index ratio for a given absorption. The solutions of the prior art have however reached a physical limit and the problem is not resolved yet.

SUMMARY OF THE INVENTION

The aim of the present invention is consequently to propose a modulator of the Mach-Zehnder type on InP or AsGa or on any other material of the III–V type, or on any other type of semiconductor material, for which the extinction ratio is the highest possible.

The present invention provides for means for compensating for the increase in the absorption in the active branch (arm) due to the application of the control voltage by dynamically modifying the coupling ratio (splitting ratio) at the input of the Mach-Zehnder.

In particular, the invention embodies a modulator of the Mach-Zehnder type in which an optical wave source is coupled to an optical waveguide separating through a coupler into two branches which recombine, the branches being respectively provided with electro-optical modulators characterised in that the coupler has an adjustable coupling ratio and in that the regulation means are provided for adjusting the said coupling ratio, following the application of at least optical modulators so that the output optical powers of the branches are respectively equal for destructive interference conditions and constructive interference conditions.

One of the branches of the modulator of the Mach-Zehnder type is subjected to a control signal in order to constitute the active branch of the said modulator.

According to one characteristic, the regulation means comprise at least one regulation electrode to which a regulation control signal is applied.

According to another characteristic, the regulation electrode is formed by the electrode of the electro-optical modulator of the active branch of the Mach-Zehnder modulator.

According to another characteristic, the Mach-Zehnder modulator comprises at least two distinct electrodes, one of which is the regulation electrode and the other electrode of the electro-optical modulator of the active branch.

According to another characteristic, the regulation electrode is situated on the same side as the active branch of the Mach-Zehnder modulator.

According to another characteristic, the regulation electrode is situated on the same side as the passive branch of the Mach-Zehnder modulator.

According to another characteristic, the coupler is a dynamic optical switch (DOS).

According to another characteristic, the regulation electrode consists of the electrodes of the DOS coupler of the Mach-Zehnder modulator.

According to another characteristic, the control signal for the electro-optical modulators is a control voltage, the control signal for regulating the regulation electrode being a regulation voltage.

According to another characteristic, the regulation voltage is a predetermined linear function of the control voltage.

The control voltage of the electrode of the electro-optical modulator is used for directly controlling the regulation electrode or indirectly by means of a control means.

According to another characteristic, the control signal for the regulation electrode is a current.

According to another characteristic, the regulation electrode is controlled by a light ray.

The Mach-Zehnder modulator according to the invention has the advantage of making it possible to obtain a very high extinction ratio at the output.

Thus, as a control voltage is applied to the active branch, a greater quantity of light will be injected in order to compensate for the amplitude loss due to the absorption of light in this branch. It will thus be possible to obtain equal output powers in the two branches so that the interference is total at the recombination point.

A control of the degree of separation at the input to the Mach-Zehnder modulator makes it possible to directly compensate for the difference in absorption in the two branches by allowing more light to pass in the active branch. The coupling ratio will therefore not be 50/50 as was generally the case in the state of the art, but will be variable and will depend directly on the control voltage applied to the electro-optical modulator of the active branch.

At the recombination point, the output powers coming from each branch will then be equal and full interference will be able to take place.

In addition, the DOS switch preferentially used as a coupler at the input of the Mach-Zehnder modulator has the advantage of being independent of the wavelength and polarisation of the input source. Such a switch is also manufactured from semiconductor materials which enable it to be integrated easily with other active components.

The modulator of the Mach-Zehnder type according to the invention also has the advantage of simple and economical implementation.

BRIEF DESCRIPTION OF THE DRAWING

Other aspects and advantages of the invention will emerge from the remainder of the description given by way of illustrative and non-limitative example with reference to the figures, in which.

DETAILED DESCRIPTION OF THE INVENTION

Figure 1:
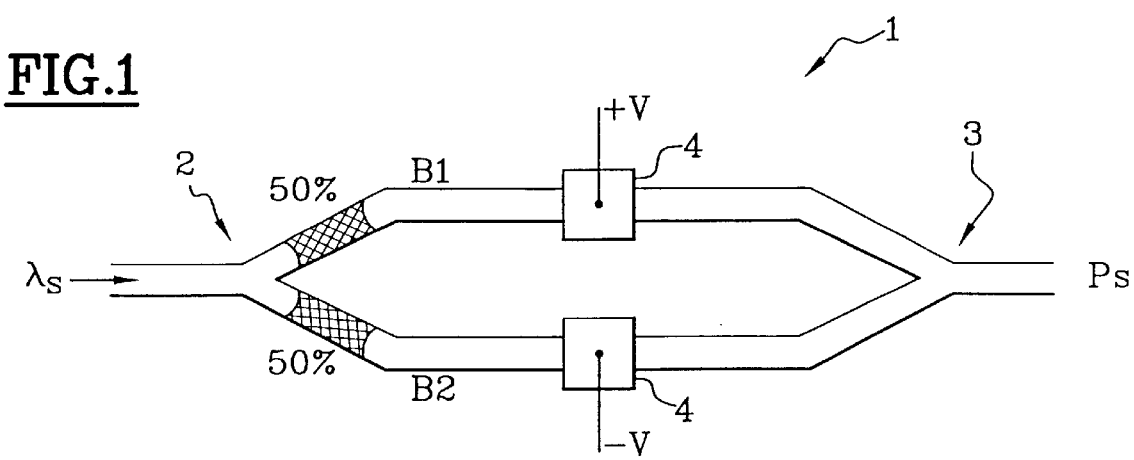
FIG. 1 illustrates a modulator of the Mach-Zehnder type according to the state of the art.

FIG. 1 illustrates a modulator of the Mach-Zehnder type 1 as known and currently used in the state of the art. A carrier optical wave $\lambda s$ at the working wavelength is applied to the input of the modulator, and then separated into two branches through a coupler 2 having a function of separating the wave into two parts.

Each branch of the modulator 1 absorbs half the optical wave.

Electro-optical modulators 4 are placed on each branch B1 and B2, and are controlled by a signal V to permit a change in index in the branches.

The control signal V will cause an electro-optical effect which will give rise to a change in index of the material to make it possible to modulate the phase or amplitude of the light wave.

At the output, the light waves coming from each branch are recombined through another coupler 3 in order to form constructive or destructive interferences.

However, the change in index caused by the control signal V applied to the electro-optical modulators of the branches also gives rise to a variation in the quantity of light absorbed by each branch, and consequently a variation in the amplitude of the light wave passing through the branch. Thus, on recombination in the output coupler 3, the two waves will not have the same amplitude and the interference will not be total.

The present invention seeks to obtain a modulator of the Mach-Zehnder type which makes it possible to obtain a very high extinction ratio at the output.

Figure 2:
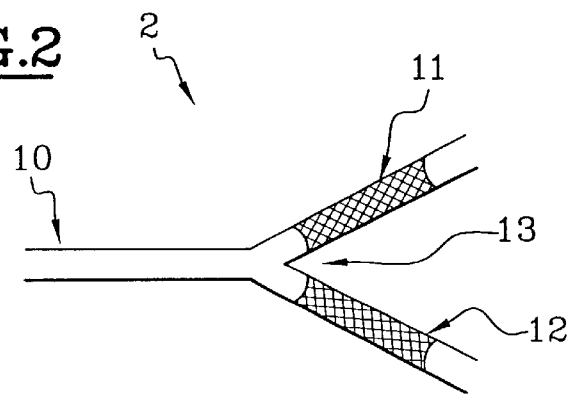
FIG. 2 illustrates a known DOS coupler.

According to a preferential embodiment of the present invention, the coupler 2 of the modulator of Mach-Zehnder type 1 consists of a dynamic optical switch (DOS) illustrated in FIG. 2.

A DOS is manufactured in a semiconductor substrate, for example of the InP/AsGa type, which integrates perfectly with the other active components of the modulator. Such a switch has a Y junction with an input arm 10 and two output arms on which ohmic contacts 11, 12 are produced, forming the electrodes of the switch.

FIGS. 3 to 6 illustrate different embodiments and different variants of a Mach-Zehnder modulator according to the present invention.

The modulator of the Mach-Zehnder type according to the invention has a waveguide separating into two branches B1 and B2 through a coupler 2 and recombining at the output through another coupler 3.

Each branch B1 and B2 comprises an electro-optical modulator 4 controlled by a signal V.

According to the embodiments, a control signal V is applied to only one branch, which constitutes the active branch B1, the other branch B2 receiving a fixed polarisation, or the two branches B1 and B2 are controlled respectively by signals modulated in opposite phase in order to constitute a so-called "push-pull" symmetrical control.

According to a preferential embodiment, the control signal V consists of a voltage ranging from 0 to 3 volts, for example.

For a given application, the control voltage V is applied to one branch, which constitutes the active branch B1. The phase modulation then takes place on two states with a phase difference of $\pi$. The active branch, B1, will consequently be subject to a variation in absorption, whilst the passive branch, B2, will be subject to no variation in absorption.

The modulator of the Mach-Zehnder type according to the invention also has means of regulating the coupling ratio between the two branches B1 and B2. These regulation means consist essentially of a regulation electrode 5 controlled by a voltage U or a current I. This regulation electrode 5 makes it possible to inject more light into the active branch B1 in order to compensate for the variation in absorption induced by the change in index caused by the control voltage V.

Thus, in the modulator of the Mach-Zehnder type according to the invention, the active branch B1 absorbs x% of the carrier wave $\lambda s$ and the passive branch B2 absorbs the remaining 100-x%. The absorption ratio between the active and passive branches can vary between 70% to 30% and 80% to 20%.

The quantity of light x% absorbed by the active branch B1 is regulated by the regulation voltage U which controls the regulation electrode 5 in order to compensate for the amplitude loss of the signal in the active branch B1 by absorption and obtain identical powers at the point 3 of recombination of the two branches. The destructive and constructive interferences will then be total and the extinction ratio will be very high.

Figure 3:
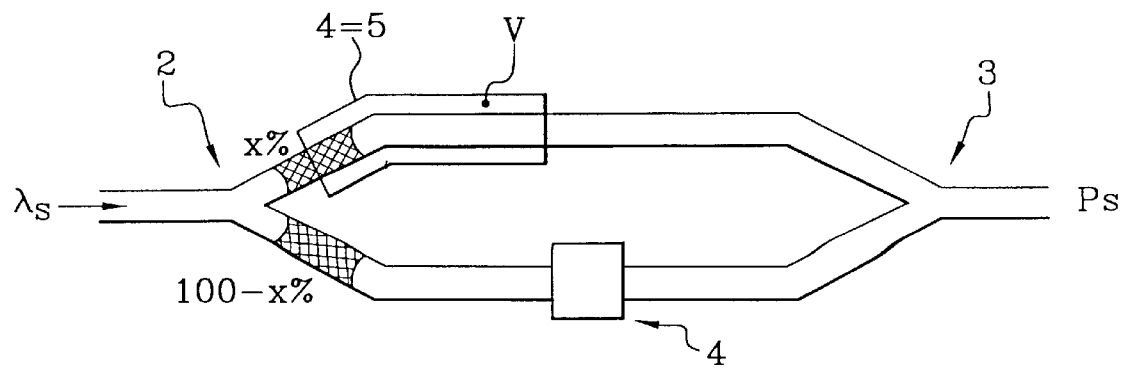
FIG. 3 illustrates a first embodiment of the present invention.

According to a first embodiment of the modulator of the Mach-Zehnder type according to the invention, illustrated in FIG. 3, one and the same electrode is used to constitute the regulation electrode 5 and the electrode of the electro-optical modulator 4. This single electrode 4=5 is situated partly on the ohmic contact 11 of the coupler 2 and partly on the active branch B1 of the modulator.

In such a case, a single control voltage V makes it possible to act on the electrode of the electro-optical modulator 4 in order to modulate the light signal passing through the active branch B1, and on the regulation electrode 5 situated on one of the electrodes 11 of one of the arms of the coupler 2 in order to dynamically regulate the coupling ratio by injecting more light into the active branch B1.

Figure 4:
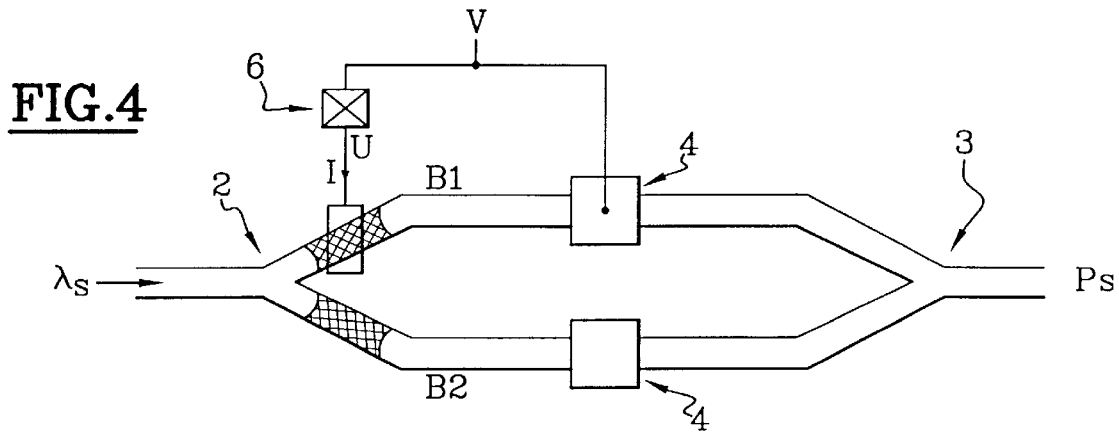
FIG. 4 illustrates a second embodiment of the present invention according to a first variant.

According to a second embodiment of the Mach-Zehnder modulator according to the invention, illustrated in FIG. 4, two distinct electrodes constitute one the electrode of the electro-optical modulator 4 and the other the regulation electrode 5. The control voltage V acts on the electrode of the electro-optical modulator 4 in order to modulate the light signal passing through the active branch B1, and the regulation voltage U acts on the regulation electrode 5 in order to inject more light into the active branch B1 in order to compensate for the amplitude loss due to absorption.

Preferentially, the regulation voltage U is a linear function of the control voltage V. The same voltage V therefore controls the electro-optical modulator 4 of the active branch and the regulation electrode 5 through a voltage multiplier or divider 6.

A prior adjustment must therefore be made statically in order to determine the linear law linking U and V in order to obtain the same amplitudes for the output powers of the two branches. Once the adjustment has been made, applying this voltage to the regulation electrode 5 makes it possible to inject as much light as necessary to compensate for the variation in absorption occasioned by the control voltage V.

Advantageously, such a system does not require the setting up of a control loop, since the relationship between U and V is linear and the parameters of the law have been determined statically.

According to a first variant of this second embodiment, illustrated in FIG. 4, the regulation electrode 5 is in contact with the electrode 11 of the arm of the DOS situated on the same side as the active branch B1.

The regulation electrode 5 is then designed to control an increase in the coupling ratio in favour of the active branch B1.

Figure 5:
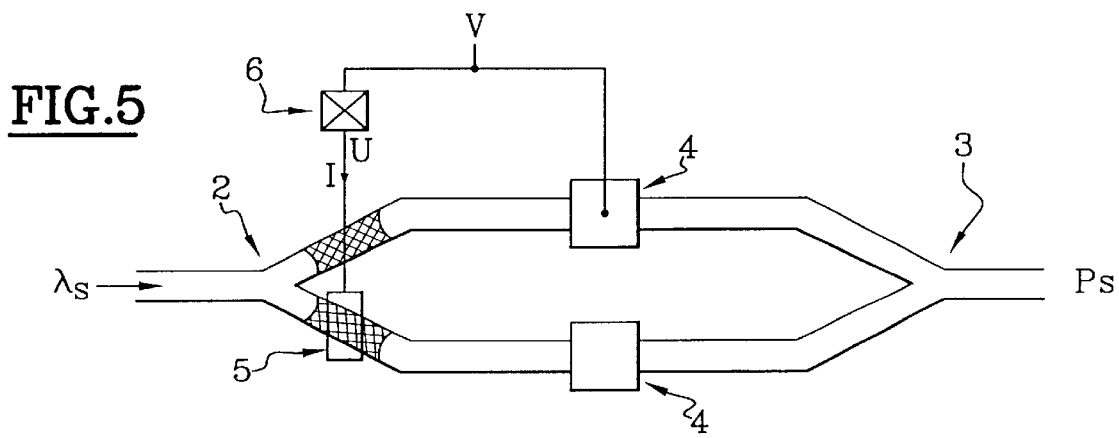
FIG. 5 illustrates a second variant of the second embodiment of the present invention.

According to a second variant of the second embodiment, illustrated in FIG. 5, the regulation electrode 5 is in contact with the electrode 12 of the arm of the DOS situated on the passive branch B2 of the Mach-Zehnder modulator.

The regulation electrode 5 is thus designed for controlling a decrease in the quantity of light entering the passive branch B2 to permit an increase in the coupling ratio in favour of the active branch B1.

Figure 6:
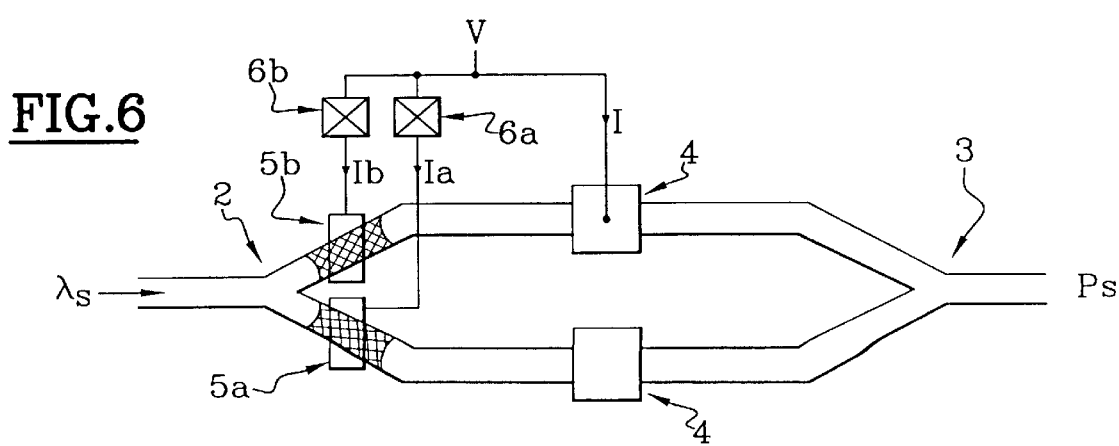
FIG. 6 illustrates a third variant of the second embodiment of the present invention.

According to a third variant of the second embodiment, illustrated in FIG. 6, the regulation electrode 5 consists of the electrodes 11 and 12 of the coupler 2 of the modulator 1.

The regulation voltage U then controls the electrodes 11 and 12 of the coupler 2 simultaneously or in alternation.

The regulation voltage U causes an increase in the quantity of light entering the active branch B1 and/or a decrease in the quantity of light entering the passive branch B2 in order to permit an increase in the coupling ratio in favour of the active branch B1 and thus compensate for the absorption of light in this branch.

Preferentially, in such a variant embodiment, the same mask can be used for producing the electrodes 11 and 12 of the coupler 2 of the modulator and the regulation electrodes 5.

Figure 7:
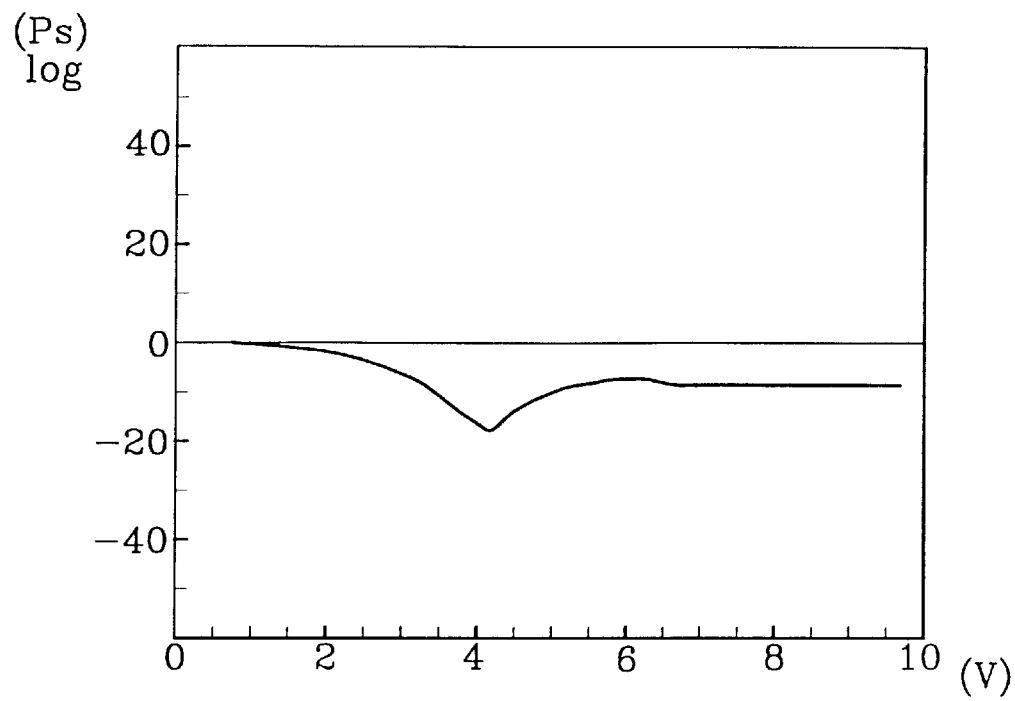
FIGS. 7 and 8 are graphs showing the light power at the output from the modulator of the Mach-Zehnder type respectively according to the state of the art and according to the present invention.
Figure 8:
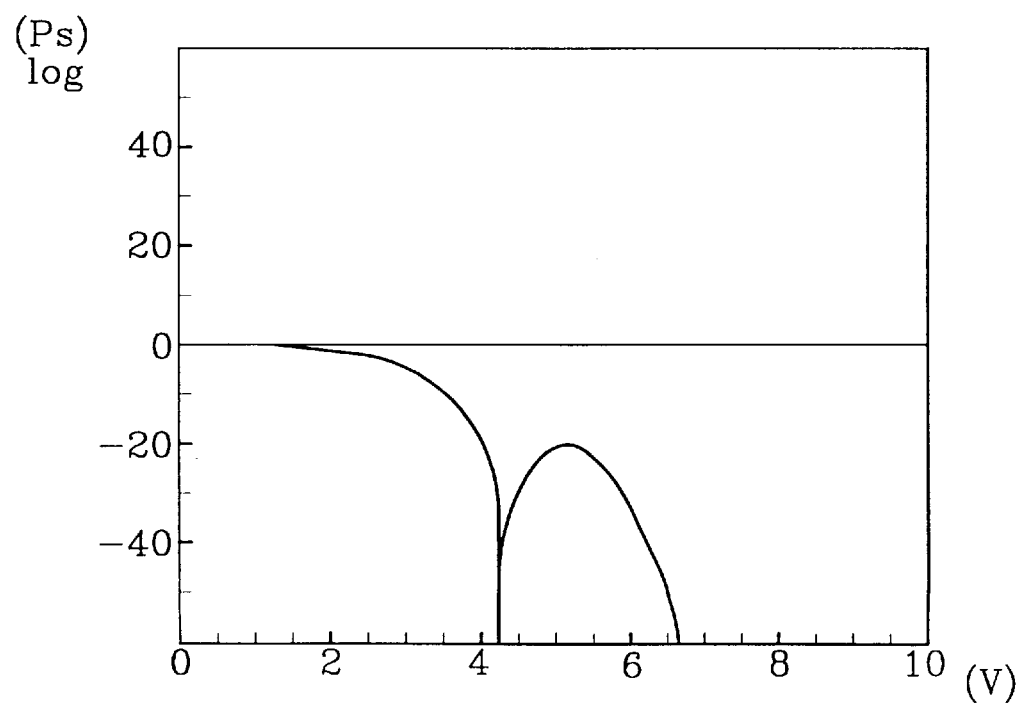

FIGS. 7 and 8 show logarithmic graphs illustrating the light power Ps at the output of the modulator of the Mach-Zehnder type as a function of the control voltage V applied respectively for a modulator of the Mach-Zehnder type according to the state of the art and for a modulator of the Mach-Zehnder type according to the present invention.

The power Ps represents the output power after interference of the light waves coming from the two branches of the modulator of the Mach-Zehnder type. This power Ps is entered on the graph in dB with respect to the output value when no voltage is applied.

These graphs clearly illustrate that the extinction ratio, which represents the ratio of the powers respectively at the high level and low level of the signal, is much higher in the case of a modulator of the Mach-Zehnder type according to the invention than the one obtained by modulators of the Mach-Zehnder type of the prior art.

For given applications, the control signal V can consist of a light ray coming from a laser, for example, in order to control the electrodes of the electro-optical modulators 4 and/or the regulation electrode 5.

For given applications, the regulation electrode 5 can be controlled by a current I, ranging from 0 to 30 mA, for example.

What is claimed is:

1. A modulator of the Mach-Zehnder type in which an optical wave source is coupled to an optical waveguide separating through a coupler (2) into two branches (B1, B2) which recombine, the branches being respectively provided with electro-optical modulators (4), characterised in that the coupler (2) has an adjustable coupling ratio and in that regulation means are provided for adjusting the said coupling ratio following the application of at least one control signal (V) to at least one of the electro-optical modulators (4) so that the output optical powers of the branches (B1, B2) are respectively equal for destructive interference conditions and for constructive interference conditions.

2. A modulator of the Mach-Zehnder type according to claim 1, in which one of the branches is subjected to a control signal (V) in order to constitute the active branch (B1) of the modulator, characterised in that the regulation means comprise at least one regulation electrode (5) to which a regulation control signal (U or I) is applied.

3. A modulator of the Mach-Zehnder type according to claim 2, characterised in that the regulation electrode (5) is formed by the electrode of the electro-optical modulator (4) of the active branch (B1) of the Mach-Zehnder modulator (1).

4. A modulator of the Mach-Zehnder type according to claim 2, characterised in that the Mach-Zehnder modulator (1) comprises at least two distinct electrodes, one of which is the regulation electrode (5) and the other is the electrode of the electro-optical modulator (4) of the active branch (B1).

5. A modulator of the Mach-Zehnder type according to claim 2, characterised in that the regulation electrode (5) is situated on the same side as the active branch (B1) of the Mach-Zehnder modulator (1).

6. A modulator of the Mach-Zehnder type according to claim 2, characterised in that the regulation electrode (5) is situated on the same side as the passive branch (B2) of the Mach-Zehnder modulator (1).

7. A modulator of the Mach-Zehnder type according to claim 2, in which the control signal for the electro-optical modulators (4) is a control voltage (V), characterised in that the control signal regulating the regulation electrode (5) is a regulation voltage (U).

8. A modulator of the Mach-Zehnder type according to claim 7, characterised in that the regulation voltage (U) is a predetermined linear function of the control voltage (V).

9. A modulator of the Mach-Zehnder type according to claim 8, characterised in that the control voltage (V) for the electrode of the electro-optical modulator (4) is used for directly controlling the regulation electrode (5) or indirectly by means of a control means (6).

10. A modulator of the Mach-Zehnder type according to claim 2, characterised in that the control signal for the regulation electrode (5) is a current. (I).

11. A modulator of the Mach-Zehnder type according to claim 2, characterised in that the regulation electrode (5) is controlled by a light ray.

12. A modulator of the Mach-Zehnder type according to claim 2, characterised in that the regulation electrode (5) consists of the electrodes (11, 12) of the DOS coupler (2) of the Mach-Zehnder modulator (1).

13. A modulator of the Mach-Zehnder type according to claim 1, characterised in that the coupler (2) is a dynamic optical switch (DOS).

\* \* \* \* \*